Sept. 13, 1955   W. P. YOW, JR., ET AL   2,717,706
CAN CARRIER HAND TRUCK
Filed Jan. 7, 1953
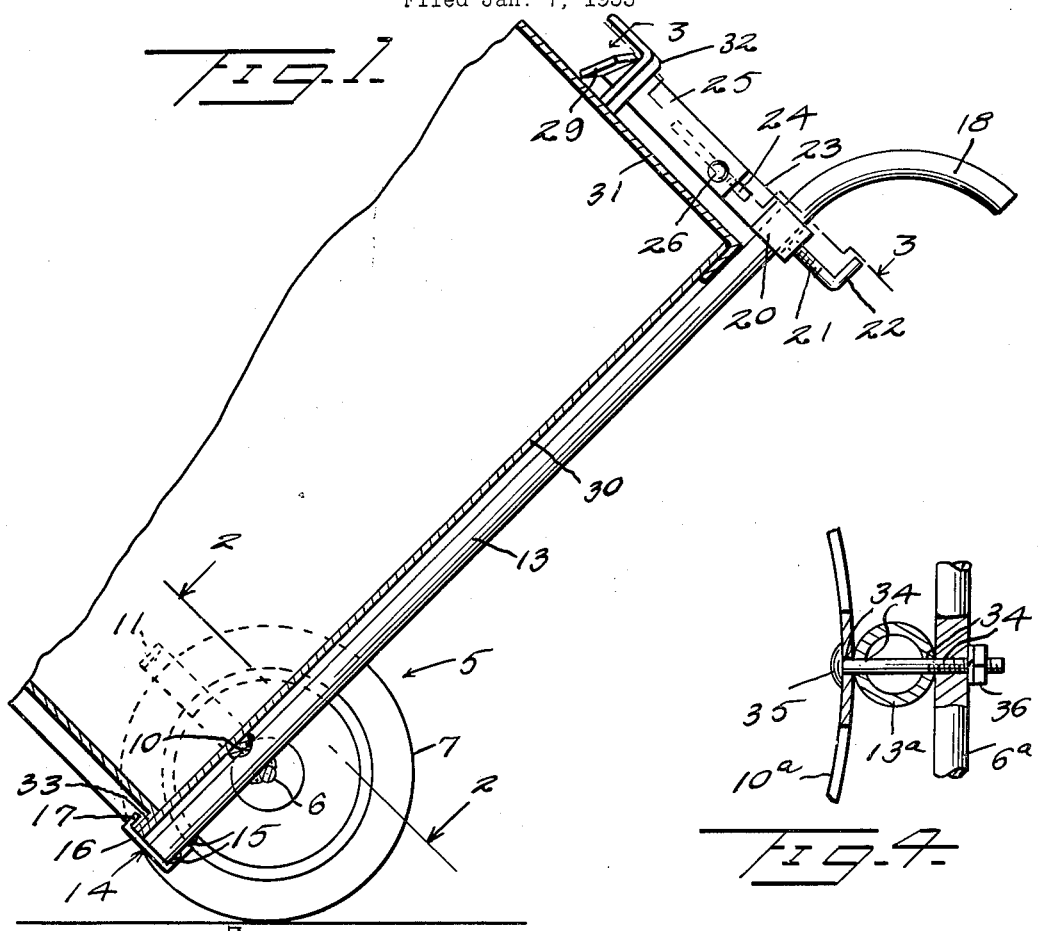
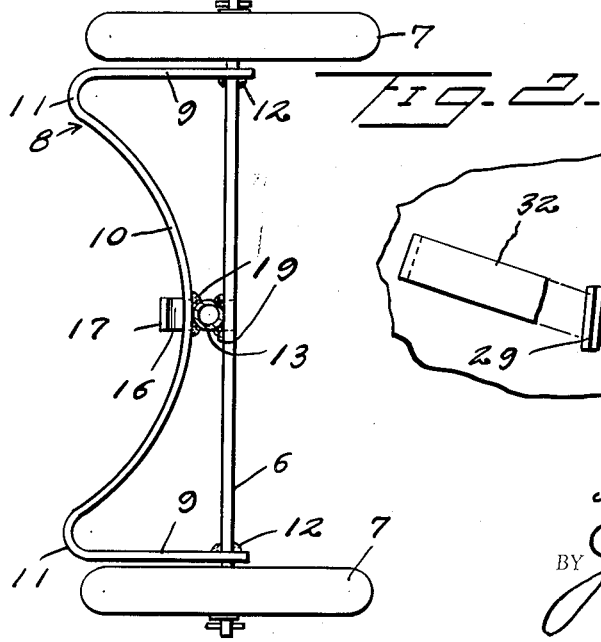
INVENTORS
William P. Yow, Jr.
Albert R. Phillips
BY John N. Randolph
ATTORNEY

United States Patent Office 2,717,706
Patented Sept. 13, 1955

2,717,706

CAN CARRIER HAND TRUCK

William P. Yow, Jr., and Albert R. Phillips, Hickory, N. C.

Application January 7, 1953, Serial No. 330,072

2 Claims. (Cl. 214—383)

This invention relates to a novel carrier or truck for carrying refuse cans, such as garbage and trash cans, and has for its primary object to provide a two wheeled carrier or truck of extremely simple construction which may be readily attached to refuse cans of different heights for supporting the can in an inclined transporting position with the weight of the can substantially balanced over the axis of the wheels, so that the can may be readily conveyed on the truck or carrier while filled, from a normal locality of use to another location to be emptied.

Another object of the invention is to provide a carrier or truck which is extremely light in weight and composed of a minimum number of parts yet which is of adequate strength and durability for effectively accomplishing its intended result.

A further object of the invention is to provide a carrier or truck by means of which cans of different sizes may be effectively engaged at each end thereof and at a point spaced from the ends of the can to effectively hold the can immovable while in a tilted transporting position on the carrier or truck.

Still another object of the invention is to provide a carrier or truck having adjustable means for engaging the handle of the can lid for effectively retaining the lid in an applied position on the can, while the can is supported in an inclined transporting position, to effectively insure that none of the contents of the can will be spilt while in transit on the truck or carrier.

Various other objects and advantages of the invention will hereinafter become more fully apparent from the following description of the drawing, illustrating a presently preferred embodiment thereof, and wherein:

Figure 1 is a vertical sectional view of the carrier or truck and of a portion of a can shown supported thereby in a transporting position;

Figure 2 is a cross sectional view of the truck taken substantially along a plane as indicated by the line 2—2 of Figure 1;

Figure 3 is a cross sectional view, partly in top plan, taken substantially along a plane as indicated by the line 3—3 of Figure 1, and on an enlarged scale, and Figure 4 is an enlarged fragmentary cross sectional view illustrating a slightly modified form of the carrier or truck.

Referring more specifically to the drawing, the carrier or truck in its entirety is designated generally 5 and includes an axle 6 having wheels 7 journalled on the ends thereof. A strip of substantially rigid metal 8 has substantially parallel end portions 9 and an arcuately bowed intermediate portion 10 the end portions of which merge integrally with corresponding ends of the end portions 9 as defined by the reversely bent strip portions 11. The axle 6 extends through the other distal ends of the end portions 9 and is suitably secured thereto as by welding, as indicated at 12, for positioning said end portions 9 between and adjacent the wheels 7. The arcuately bowed intermediate portion 10 is disposed between the end portions 9 and is bowed toward the axle 6, so that the convex side of the intermediate portion 10 faces toward the axle 6. A single elongated member 13 which may be either solid or tubular has a lower end to which a short rigid bar 14 is secured in any suitable manner, as by welding, as indicated at 15. A portion of the bar 14 is disposed against said lower end of the member 13 and another portion 16 thereof projects from the lower end of the member 13 to provide a supporting member which is provided with an upturned free end 17, forming a hook. The upper end of the member 13 is curved in a direction away from the supporting member 16 to form a handle 18. A part of the elongated member 13, located adjacent its lower end, fits snugly between the intermediate portion of the axle 6 and the middle part of the arcuate strip portion 10 and is secured to the axle 6 and strip 10 by welding, as indicated at 19. The support 16 extends forwardly beneath a part of the strip portion 10 which is secured to the elongated member 13. Said elongated member 13 is preferably formed of any suitable substantially rigid metal and the straight portion thereof is of a length greater than the length of a conventional garbage or trash can.

The carrier or truck 5 also includes a sleeve 20 which is slidably and turnably mounted on the elongated member 13 and adjustably anchored thereto by a setscrew 21 having an angularly disposed handle 22 at its outer end. A bar 23 is suitably fixed to or formed integral with the sleeve 20 and projects radially therefrom and is provided with an elongated slot 24. A second elongated bar 25 has a headed bolt 26 extending therethrough adjacent an inner end thereof and which slidably fits the slot 24. A wing nut 27 is carried by the bolt 26 and is adapted to be tightened for clamping the bars 23 and 25 together in different extended positions. The bar 25 at its inner end is provided with an inwardly extending tit 28 which slidably engages the slot 24 to cooperate with the bolt 26 to prevent the bar 25 from turning on the bolt 26 relatively to the bar 23. The extensible bar 25 extends beyond the outer end of the bar 23 and has an angularly turned and twisted free end portion form a handle engaging hook 29. A portion of a conventional garbage or trash can 30 is illustrated in Figure 1 including a portion of the cover or lid 31 for closing the upper end of the can 30 and which cover is provided with a conventional bail type handle 32.

Assuming that the can 30 is filled or substantially filled with garbage or trash or other refuse, and that it is desired to move the can from its normal position of use to a position where it will be emptied, it will be readily apparent that the filled can 30 may be quite heavy and quite inconvenient and unsanitary to carry manually. However, with the carrier or truck 5, the can 30 filled to capacity and with the lid or cover 31 applied to its open upper end, may be conveniently and easily transported. This is readily accomplished by positioning the elongated member in substantially an upright position and by tilting the can 30 slightly so that the bar portion 16 can be inserted beneath a portion of the flanged bottom 33 of the can and with the upturned hook portion 17 disposed on the inner side of the flange 33. With the bar portion 16 thus disposed, the intermediate strip portion 10 will partially embrace a portion of the side wall of the can 30 and will be disposed circumferentially of said can portion. With the setscrew 21 and wing nut 27 loosened, the extensible bar 23, 25 may be swung with the sleeve 20 around the elongated member 13 and slid longitudinally thereof to position the handle engaging hook 29 in the cover handle 32 and against a portion of the cover 31. The extensible bar section 25 may then be retracted as far as possible, as illustrated in Figures 1 and 3 and the nut 27 then tightened and likewise the setscrew 21 to retain the bar 23, 25 in its position of Figures 1 and 3 in tight engagement with the handle 32 and against the lid 31, to hold the lid on the can 30 and to prevent the upper end of the can from swinging away from the elongated member 13. The handle 32 can then be grasped to rock the truck parts to an inclined position as illustrated in Figure 1 with the axle 6 turning in the hubs of the wheels 7 for pivoting said parts and so as to substantially balance the weight of the can 30 and its contents over the axle 6. With the axle and wheels thus supporting the weight of the load in substantially a balanced position, the handle 18 can be grasped in either hand for pushing the carrier or truck and the loaded can 30 supported thereby to another location where the can is to be emptied.

It will be noted that the extensible bar 23, 25 will effectively retain the cover 31 in a position to close and seal the open end of the can 30 so that none of the contents thereof can spill onto the operator of the carrier and so that the can will be held immovably on the truck 5 until the setscrew 21 is loosened and the bar 23, 25 swung with the sleeve 20 to disengage the handle hook 29 from the lid 31 and handle 32. Thus, the can is effectively held at both ends thereof and at a point spaced from its ends to positively hold the can immovably on the truck while the elongated member 13 is in either an upright or a tilted position.

Figure 4 illustrates a slightly modified form of the truck 5 and wherein the axle 6a, the elongated member 13a and the middle part of the arcuate strip portion 10a are provided with aligned openings 34 through which extends the shank of a headed bolt 35, the head of which is disposed against the concave side of the arcuate strip 10a. A nut 36 engages the opposite end of the bolt 35 to retain the parts assembled. The bolt 35 and nut 36 are employed in lieu of the soldering 19 so that by removing the nut and bolt the elongated member 13a can be detached from the axle 6a and strip 10a to enable the truck to thus be partially dismantled for storage in a very restricted space.

Various other modifications and changes are contemplated and may obviously be resorted to, without departing from the spirit or scope of the invention as hereinafter defined by the appended claims.

We claim as our invention:

1. A carrier or truck comprising an axle, supporting wheels journalled on the ends of the axle, an arcuate can embracing strip spaced from said axle and having turned back ends secured to the axle between and adjacent the wheels, the convex side of said arcuate strip being disposed to face toward the axle, an elongated member having a lower end provided with an outwardly extending can supporting bar portion having an upturned free end, a portion of said elongated member disposed adjacent said lower end being located between the intermediate portion of the axle and an intermediate part of said arcuate strip and being secured to said strip and axle for positioning the can supporting bar portion beneath said arcuate strip, a bar having a sleeve at one end thereof turnably and slidably disposed on said elongated member, means to adjustably secure the sleeve to said elongated member, and a cover and cover handle engaging hook formed on the opposite end of said bar, said can supporting bar being adapted to engage under a portion of the bottom flange of a can with the upturned end thereof engaging the inner side of the flange, said last mentioned hook being adapted to engage in the cover handle and against the cover, and said arcuate strip embracing a circumferential portion of the can spaced from the ends thereof.

2. A carrier or truck as in claim 1, and means detachably fastening the intermediate portions of said arcuate strip and axle to said elongated member.

References Cited in the file of this patent
UNITED STATES PATENTS

| | | |
|---|---|---|
| 641,286 | Gilfillan | Jan. 16, 1900 |
| 851,164 | Davenport | Apr. 23, 1907 |
| 866,797 | Miller | Sept. 24, 1907 |
| 1,820,728 | Calis | Aug. 25, 1931 |
| 2,044,363 | Morse et al. | June 16, 1936 |
| 2,329,439 | Hanssen | Sept. 14, 1943 |
| 2,599,855 | Michaux, Jr. | June 10, 1952 |
| 2,634,933 | Grimsley | Apr. 14, 1953 |
| 2,650,786 | Platt | Sept. 1, 1953 |